(12) United States Patent
Togashi et al.

(10) Patent No.: US 7,558,049 B1
(45) Date of Patent: Jul. 7, 2009

(54) MULTILAYER CAPACITOR ARRAY

(75) Inventors: Masaaki Togashi, Tokyo (JP); Takashi Aoki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/274,868

(22) Filed: Nov. 20, 2008

(30) Foreign Application Priority Data

Dec. 20, 2007 (JP) .............................. 2007-329191

(51) Int. Cl.
  *H01G 4/228* (2006.01)
(52) U.S. Cl. .............. 361/306.3; 361/306.1; 361/306.2; 361/308.1; 361/321.1; 361/303
(58) Field of Classification Search .............. 361/306.3, 361/306.1, 306.2, 301.2, 301.4, 311–313, 361/321.1, 321.2, 307, 308.1, 309, 302–305
See application file for complete search history.

(56) References Cited

U.S. PATENT DOCUMENTS

| | | | | |
|---|---|---|---|---|
| 5,583,738 A | * | 12/1996 | Kohno et al. | ................. 361/312 |
| 6,327,134 B1 | * | 12/2001 | Kuroda et al. | ................ 361/303 |
| 6,331,929 B1 | * | 12/2001 | Masuda | ....................... 361/303 |
| 6,519,134 B1 | * | 2/2003 | Li et al. | .................... 361/306.1 |
| 6,587,327 B1 | * | 7/2003 | Devoe et al. | ............. 361/306.3 |
| 6,768,630 B2 | * | 7/2004 | Togashi | .................... 361/306.1 |
| 7,046,500 B2 | * | 5/2006 | Lee et al. | ..................... 361/303 |

FOREIGN PATENT DOCUMENTS

JP     A-11-26291     1/1999

* cited by examiner

*Primary Examiner*—Nguyen T Ha
(74) *Attorney, Agent, or Firm*—Oliff & Berridge, PLC

(57) ABSTRACT

Among a plurality of first inner electrodes, at least one first inner and a second inner electrode are arranged as opposed with at least one of the dielectric layers in between. Third and fourth inner electrodes are arranged as opposed with at least one of the dielectric layers in between. The first inner electrodes are electrically connected to a first external connection conductor via lead conductors. The second inner electrode is electrically connected to a second terminal conductor via a lead conductor. The third inner electrode is electrically connected to a third terminal conductor via a lead conductor. The fourth inner electrode is electrically connected to a fourth terminal conductor via a lead conductor. Among all the first inner electrodes, one to multiple first inner electrodes that are less than the total first inner electrodes are electrically connected to the first terminal conductors via lead conductors.

11 Claims, 8 Drawing Sheets

MULTILAYER CAPACITOR ARRAY

BACKGROUND OF THE INVENTION

1. Field of the Invention

The present invention relates to a multilayer capacitor array.

2. Related Background Art

As the size and thickness of electronic devices are reduced, integration of capacitors to be mounted in such electronic devices is required. Therefore, in recent years, capacitor arrays including a plurality of capacitors in a single chip have been developed. For example, a known multilayer capacitor array includes a laminated body formed of alternately laminated internal electrode layers, each having internal electrodes arranged parallel to each other, and dielectric layers, and terminal conductors formed on the laminated body (for example, refer to Japanese Unexamined Patent Application Publication No. Hei 11-26291).

While a reduction in the power-supply voltage for a central processing unit (CPU) mounted in a digital electronic device has been achieved, the load current has increased. Because it is very difficult to keep variations in the power-supply voltage, caused by abrupt changes in the load current, within an allowable range, a multilayer capacitor serving as a decoupling capacitor is connected to the power supply. During transient variations in the load current, the multilayer capacitor supplies an electric current to the CPU to control variations in the power-supply voltage.

SUMMARY OF THE INVENTION

Recently, as the operating frequency of CPUs these days increases, the load current is becoming faster and greater. Therefore, there are demands for increasing the capacitance and equivalent series resistance (ESR) of the multilayer capacitors used as decoupling capacitors.

However, Japanese Unexamined Patent Application Publication No. Hei 11-26291 does not mention the ESR of the multilayer capacitor array.

The present invention has been made to solve the above-described problem, and an object thereof is to provide a multilayer capacitor array having controllable ESR.

In a typical multilayer capacitor array, all internal electrodes are connected to respective terminal conductors through lead conductors. Therefore, the lead conductors to be connected to the terminal conductors are provided in the same number as the internal electrodes, making the ESR small. If the number of the laminated dielectric layers and internal electrode layers is increased in order to enhance the capacitance of the multilayer capacitor array, the number of lead conductors also increases. Because resistance components of the lead conductors to be connected to the terminal conductors are connected in parallel to the terminal conductors, the ESR of the multilayer capacitor array further decreases as the number of the lead conductors to be connected to the terminal conductors increases. For example, in the multilayer capacitor array disclosed in Japanese Unexamined Patent Application Publication No. Hei 11-26291, because all the internal electrodes are directly connected to the terminal conductors, the ESR decreases with an increase in electrostatic capacitance associated with an increase in the number of laminated layers to meet a trend toward higher capacitance. The demands for higher capacitance and greater ESR of multilayer capacitor arrays are in conflict with each other.

The present inventors carried out extensive research into a multilayer capacitor array that can meet the demands for higher capacitance and greater ESR. As a result, the present inventors discovered that the ESR can be adjusted to a desired value by connecting internal electrodes to each other through an external connecting conductor disposed on the laminated body and by changing the number of lead conductors without a change in the number of laminated dielectric layers and internal electrode layers. In addition, the present inventors discovered that the ESR can be adjusted to a desired value by connecting the internal electrodes to each other through the external connecting conductor disposed on the surface of the laminated body and by changing the position of the lead conductors in the laminating direction of the laminated body. In particular, a higher ESR can be achieved by making the number of the lead conductors smaller than the number of the internal electrodes.

With reference to the research results, a multilayer capacitor according to the present invention includes a laminate body having a plurality of laminated dielectric layers; and a plurality of external conductors placed on the laminate body, the laminate body having: rectangular first and second principal surfaces facing each other in a laminating direction of the dielectric layers, first and second side surfaces facing each other and extending in a longitudinal direction of the first and second principal faces so as to connect the first and second principal faces, third and fourth side surfaces facing each other and extending in a transverse direction of the first and second principal faces so as to connect the first an second principal faces, a first inner electrode group including a plurality of first electrodes and a second electrode, and a second inner electrode group including a third electrode and a fourth electrode, wherein the external conductors include first to fourth terminal conductors disposed on one of the first and second side surfaces, and a first external connection conductor disposed on a side surface placed on at least one of the first to fourth terminal conductors, wherein the first inner electrode group and the second inner electrode group are adjacent to each other in a opposed direction of the third and fourth side surfaces in the laminate body, wherein at least one of the first inner electrodes and the second inner electrode are arranged as opposed with at least one of the dielectric layers in between, wherein the third and fourth inner electrodes are arranged as opposed with at least one of the dielectric layers in between, wherein the first inner electrodes are electrically connected to the first external connection conductor via lead conductors, wherein the second inner electrode is electrically connected to the second terminal conductor via a lead conductor, wherein the third inner electrode is electrically connected to the third terminal conductor via a lead conductor, wherein the fourth inner electrode is electrically connected to the fourth terminal conductor via a lead conductor, and wherein, among all the first inner electrodes, one to multiple first inner electrodes that are less than the total first inner electrodes are electrically connected to the first terminal conductor via lead conductors.

In the multilayer capacitor array according to the present invention, only part of the first inner electrodes is connected to the first terminal conductor via the lead conductors. By connecting only part of the first inner electrodes to the first terminal conductor via the lead conductors, the equivalent series resistance of the capacitors each composed of the first and second inner electrodes and the dielectric layer can be adjusted. The present invention provides a multilayer capacitor array capable of adjusting equivalent series resistance.

According to the present invention, the first external connection conductor is disposed on the side surface (first or second side surface) on which at least one of the first to fourth terminal conductors is provided. In this way, the first external connection conductor and the terminal conductors provided on the side surface on which the first external connection conductor is provided can be prepared simultaneously, and the manufacturing process (process of forming the external conductors) can be simplified.

Preferably, the first terminal conductor, the fourth terminal conductor, and the first external connection conductor are disposed on the first side surface, and the second and third terminal conductors are disposed on the second side surface. In such a case, the first external connection conductor and the first and fourth terminal conductors can be prepared simultaneously.

Preferably, the first and the fourth terminal conductors are disposed on the first side surface, while the second terminal conductor, the third terminal conductor, and the first external connection terminal are disposed on the second side surface. In such a case, the first external connection conductor and the second and third terminal conductors can be prepared simultaneously. Since the first terminal conductor and the first external connection conductor, respectively, are disposed on the first side surface and the second side surface facing each other, the electric current path from the first terminal conductor to the first external connection conductor is relatively long. This structure ensures an increased equivalent series resistance of the capacitors including the first and second inner electrodes and the dielectric layer.

Preferably, the first inner electrode group is positioned on the third side surface side in the opposed direction of the third and fourth side surfaces, the external conductors further include a second external connection conductor disposed on the third side surface, the first inner electrode group includes a plurality of the second inner electrodes, the second inner electrodes are electrically connected to the second external connection conductor via lead conductors, and among all the second inner electrodes, one to multiple second inner electrodes that are less than the total second inner electrodes are electrically connected to the second terminal conductors via lead conductors. In such a case, only part of the second inner electrodes is connected to the second terminal conductor via the lead conductors. By connecting only part of the second inner electrodes to the second terminal conductor via the lead conductors, the equivalent series resistance of the capacitors, each composed of the first and second inner electrodes and the dielectric layer can be adjusted. Since the second external connection conductor is disposed on the third side surface, which is different from the side surface on which the first to fourth terminal conductors and the first external connection conductor are disposed, short-circuiting will not occur among the first to fourth terminal conductors, the first external connection conductor, and the second external connection conductor. Preferably, the first and second inner electrodes are arranged as opposed with at least one of the dielectric layers in between. This structure ensures a relatively large capacitance of the capacitors composed of the first and second inner electrodes and the dielectric layers.

Preferably, the second inner electrode group includes a plurality of the third inner electrodes, the external conductors further include a third external connection conductor disposed on a side surface on which at least one of the first to fourth terminal conductors is disposed, at least one of the third inner electrodes and the fourth inner electrode are arranged as opposed with at least one of the dielectric layers in between, the third inner electrodes are electrically connected to the third external connection conductor via lead conductors, and among all the third inner electrodes, one to multiple third inner electrodes that are less than the total third inner electrodes are electrically connected to the third terminal conductors via lead conductors. In such a case, only part of the third inner electrodes is connected to the third terminal conductor via the lead conductors. By connecting only part of the third inner electrodes to the third terminal conductor via the lead conductors, the equivalent series resistance of the capacitors each composed of the third and fourth inner electrodes and the dielectric layer can be adjusted. Since the third external connection conductor is disposed on the side surface (first or second side surface) on which at least one of the first to third terminal conductors is disposed, the third external connection conductor and the terminal conductors on the side surfaces on which the third external connection conductor is disposed can be prepared simultaneously. As a result, the manufacturing process (preparation process of the external conductors) can be simplified.

Preferably, the first terminal conductor, the fourth terminal conductor, and the third external connection conductor are disposed on the first side surface, and the second and third terminal conductors are disposed on the second side surface. In such a case, the third external connection conductor and the second and third terminal conductors can be prepared simultaneously. Since the third terminal conductor and the third external connection conductor, respectively, are disposed on the first side surface and the second side surface facing each other, the electric current path from the third terminal conductor to the third external connection conductor is relatively long. This structure ensures a relatively large equivalent series resistance of the capacitors composed of the third and fourth inner electrodes and the dielectric layers.

Preferably, the first and fourth terminal conductors are disposed on the first side surface, while the second terminal conductor, the third terminal conductors, and the third external connection conductor are disposed on the second side surface. In such a case, the third external connection conductor and the second and third terminal conductors can be prepared simultaneously.

Preferably, the second inner electrode group is positioned on the fourth side surface side across the third and fourth side surfaces, the external conductors further include a fourth external connection conductor disposed on the fourth side surface, the second inner electrode group includes a plurality of the fourth inner electrodes, the fourth inner electrodes are electrically connected to the fourth external connection conductor via lead conductors, and among all the fourth inner electrodes, one to multiple fourth inner electrodes that are less than the total fourth inner electrodes are electrically connected to the fourth terminal conductors via lead conductors. In such a case, only part of the fourth inner electrodes is connected to the fourth terminal conductor via the lead conductors. By connecting only part of the fourth inner electrodes to the fourth terminal conductor via the lead conductors, the equivalent series resistance of the capacitors each composed of the third and fourth inner electrodes and the dielectric layer can be adjusted. Since the fourth external connection conductor is disposed on the fourth side surface, which is different from the side surface on which the first to fourth terminal conductors and the first and third external connection conductors are disposed, short-circuiting will not occur among the first to fourth terminal conductors, the first and third external connection conductors, and the fourth external connection conductor.

Preferably, the third and fourth inner electrodes are arranged as opposed with at least one of the dielectric layers in between. This structure ensures a relatively large capacitance of the capacitors composed of the third and fourth inner electrodes and the dielectric layers.

Preferably, at least one of the first and second inner electrodes and at least one of the third and fourth inner electrodes are disposed on the same layer, and the inner electrodes disposed on the same layer have different polarities. In such a case, the electric currents flow through the inner electrodes on the same layer in directions opposite to each other, and thus, the equivalent series inductance is reduced even more.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
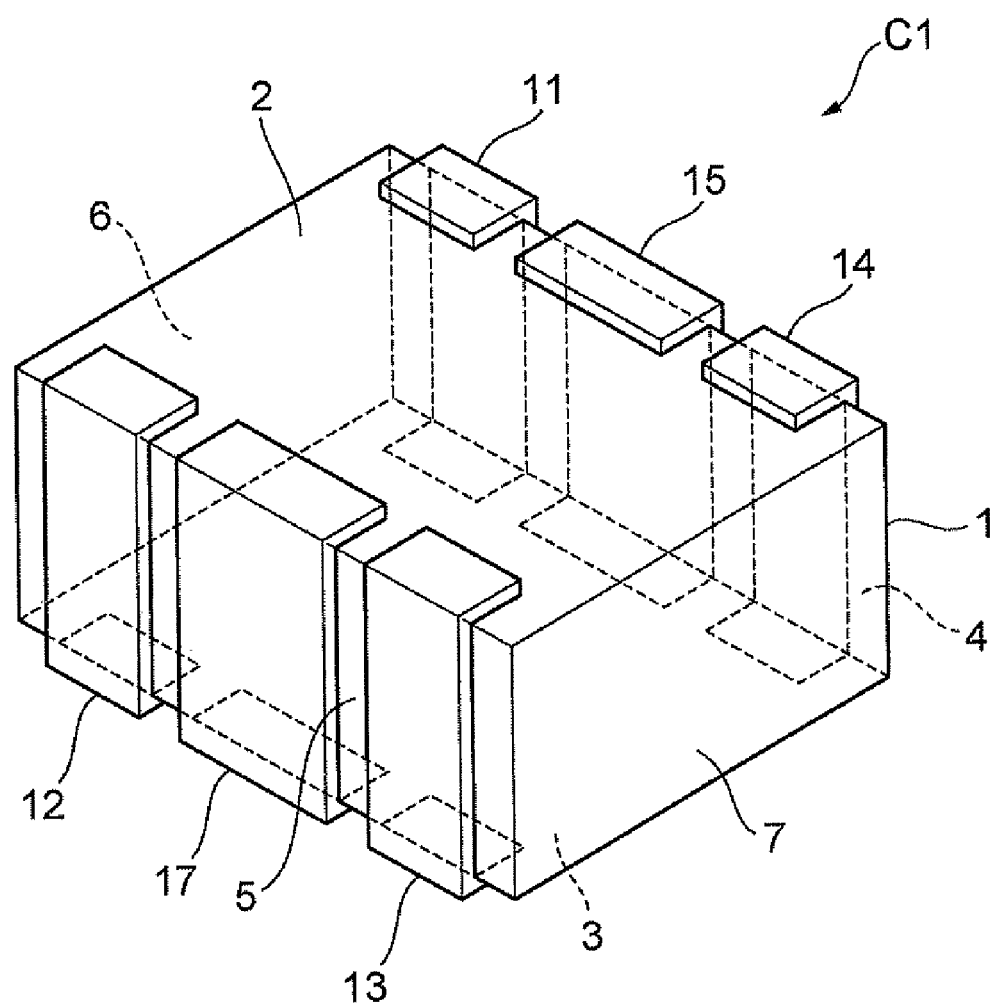
FIG. 1 is a perspective view of a multilayer capacitor array according to a first embodiment.

Preferred embodiments of the present invention will be described in detail below with reference to the accompanying drawings. Throughout the specification, the same components and components having the same functions are represented by the same reference numerals without repeated description.

First Embodiment

Figure 2:
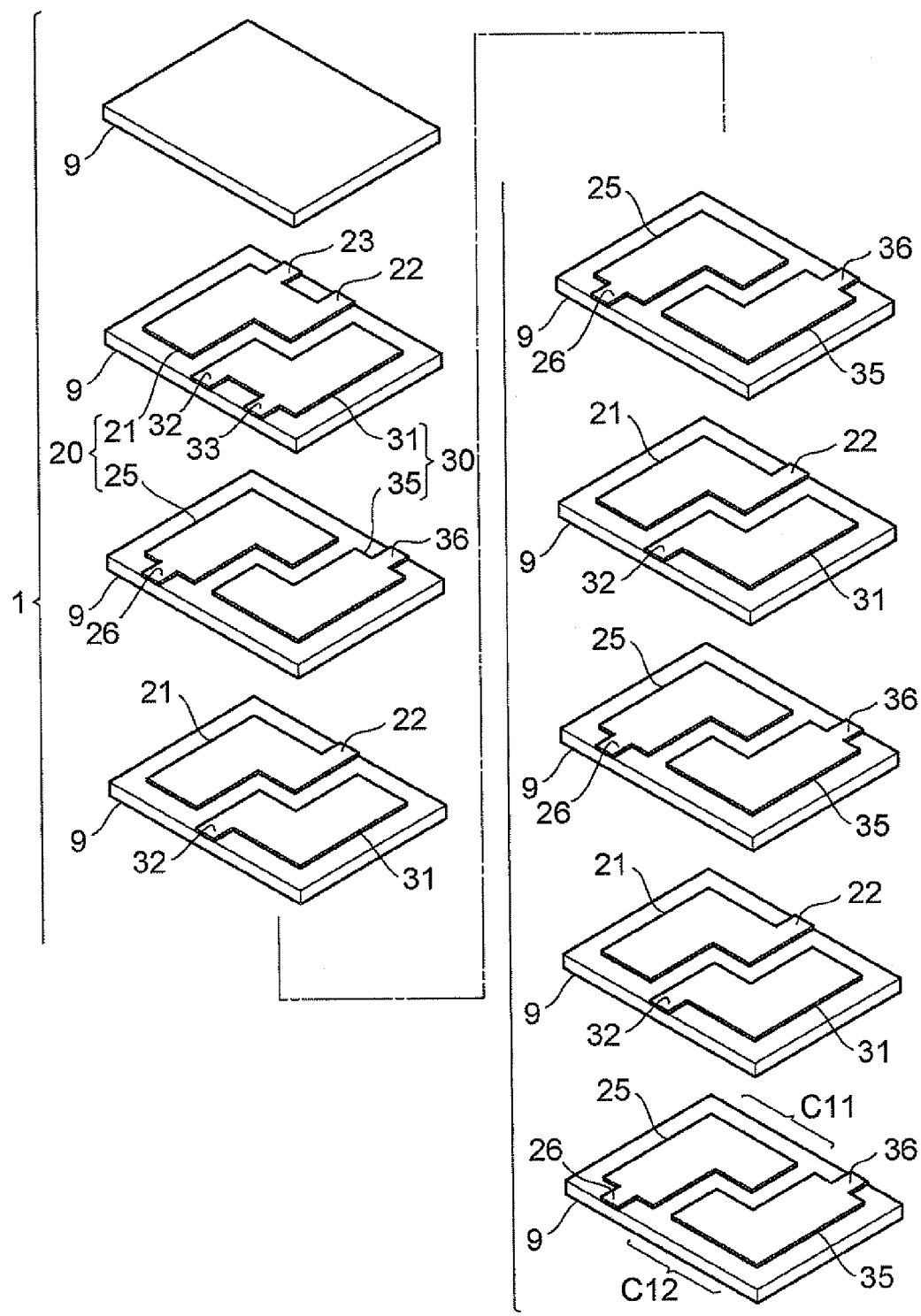
FIG. 2 is an exploded perspective view of a capacitor element included in the multilayer capacitor array according to the first embodiment.

The configuration of a multilayer capacitor array C1 according to a first embodiment of the present invention will be described with reference to FIGS. 1 and 2. FIG. 1 is a perspective view of the multilayer capacitor array according to the first embodiment. FIG. 2 is an exploded perspective view of a capacitor element included in the multilayer capacitor array according to the first embodiment.

With reference to FIG. 1, the multilayer capacitor array C1 of the first embodiment includes including a laminate body 1 as a capacitor element and a plurality of external conductors 11 to 15 and 17 disposed on the outer surfaces of the laminate body 1.

The laminate body 1 is a substantially rectangular solid and has rectangular first and second main surfaces 2 and 3 facing each other, first and second side surfaces 4 and 5 facing each other, and third and fourth side surfaces 6 and 7 facing each other. The first and second side surfaces 4 and 5 extend in the lengthwise direction of the first and second main surfaces 2 and 3 so as to connect the first and second main surfaces 2 and 3. The third and fourth side surfaces 6 and 7 extend in the widthwise direction of the first and second main surfaces 2 and 3 so as to connect the first and second main surfaces 2 and 3. The first main surface 2 or the second main surface 3 functions as a mounting surface for other components (for example, circuit boards and electronic components).

With reference to FIG. 2, the laminate body 1 includes a plurality of dielectric layers 9. The laminate body 1 is a lamination of the plurality of dielectric layers 9 in the opposed direction of the first and second main surfaces 2 and 3, and has dielectric characteristics. The dielectric layers 9 are each prepared by sintering a ceramic green sheet containing dielectric ceramic material, such as $BaTiO_3$, $Ba(Ti,Zr)O_3$, or $(Ba,Ca)TiO_3$. In an actual multilayer capacitor array C1, the dielectric layers 9 are integrated in such manner that their interfaces are invisible.

The first and second main surfaces 2 and 3 oppose each other in the laminating direction of these dielectric layers 9. The first and second side surfaces 4 and 5 oppose each other in a first direction orthogonal to the laminating direction of the dielectric layers 9. The third and fourth side surfaces 6 and 7 oppose each other in the laminating direction of the dielectric layers 9 and the first direction (the opposed direction of the first and second side surfaces 4, 5).

The external conductors include first to fourth terminal conductors 11 to 14 and first and third external connection conductors 15 and 17. The first to fourth terminal conductors 11 to 14 and the first and third external connection conductors 15 and 17 are formed by, for example, applying and sintering a conductive paste containing conductive metal powder and glass frit to the outer surfaces of the laminate body 1. Optionally, a plating layer may be formed on the sintered conductors 11 to 15 and 17.

The first terminal conductor 11, the fourth terminal conductor 14, and the first external connection conductor 15 are disposed on the first side surface 4 of the laminate body 1. The first and fourth terminal conductors 11 and 14 and the first external connection conductor 15 extend from the first main surface 2 to the second main surface 3 across the first side surface 4 so as to partly cover the first side surface 4. The first and fourth terminal conductors 11 and 14 and the first external connection conductor 15 are electrically isolated from each other at the outer surfaces of the laminate body 1. The first terminal conductor 11, the first external connection conductor 15, and the fourth terminal conductor 14 are disposed on the first side surface 4, in this order from the third side surface 6 of the laminate body 1.

The second terminal conductor 12, the third terminal conductor 13, and the third external connection conductor 17 are disposed on the second side surface 5 of the laminate body 1. The second and third terminal conductors 12 and 13 and the third external connection conductor 17 extend from the first main surface 2 to the second main surface 3 across the second side surface 5 so as to partly cover the second side surface 5. The second and third terminal conductors 12 and 13 and the third external connection conductor 17 are electrically isolated from each other at the outer surfaces of the laminate body 1. The second terminal conductor 12, the third external connection conductor 17, and the third terminal conductor 17 are disposed on the first side surface 4, in this order from the third side surface 6 of the laminate body 1.

As shown in FIG. 2, the laminate body 1 includes a first inner electrode group 20 and a second inner electrode group 30. The first inner electrode group 20 includes a plurality of first inner electrodes 21 and a plurality of second inner electrodes 25. The second inner electrode group 30 includes a plurality of third inner electrodes 31 and a plurality of fourth inner electrodes 35.

The first, second, third, and fourth inner electrodes 21, 25, 31, and 35 are disposed inside the laminate body 1. The first, second, third, and fourth inner electrodes 21, 25, 31, and 35 are composed of a conductive material (for example, Ni, which is a base metal) that is usually used for an inner electrode of a laminated electrical device. The first, second, third, and fourth inner electrodes 21, 25, 31, and 35 are prepared by sintering a conductive paste containing such a conductive material.

The laminate body 1 has a region where the first inner electrode group 20 is disposed and a region where the second inner electrode group 30 is disposed. These regions are disposed in the opposed direction of the third and fourth side surfaces 6, 7. In other words, the first inner electrode group 20 and the second inner electrode group 30 are adjacent to each other in the opposed direction of the third and fourth side surfaces 6, 7. More specifically, the first inner electrode group 20 is adjacent to the third side surface 6, and the second inner electrode group 30 is adjacent to the fourth side surface 7.

The opposing first and second inner electrodes 21 and 25 are arranged as opposed with one dielectric layer 9 in between. That is, the first and second inner electrodes 21 and 25 are separated by a single dielectric layer 9. The opposing third and fourth inner electrodes 31 and 35 are arranged as opposed with one dielectric layer 9 in between. That is the third and fourth inner electrodes 31 and 35 are separated by a single dielectric layer 9. The first inner electrodes 21 overlap with neither the third inner electrodes 31 nor the fourth inner electrodes 35 in the opposed direction of the first and second main surfaces 2, 3 (the laminating direction of the dielectric layers 9). The second inner electrodes 25 overlap with neither the third inner electrodes 31 nor the fourth inner electrodes 35 in the opposed direction of the first and second main surfaces 2, 3. Consequently, the third and fourth inner electrodes 31 and 35 overlap with neither the first inner electrodes 21 nor the second inner electrodes 25 in the opposed direction of the first and second main surfaces 2, 3.

The first inner electrodes 21 and the third inner electrodes 31 are disposed at a predetermined interval in the opposed direction of the third and fourth side surfaces 6, 7. The first inner electrodes 21 and the third inner electrodes 31 are disposed at the same position (layer) in the opposed direction of the first and second main surfaces 2, 3. The first and third inner electrodes 21 and 31 are disposed in this order from the third side surface 6.

The second inner electrodes 25 and the fourth inner electrodes 35 are disposed at a predetermined interval in the opposed direction of the third and fourth side surfaces 6, 7. The second inner electrodes 25 and the fourth inner electrodes 35 are disposed at the same position (layer) in the opposed direction of the first and second main surfaces 2, 3. The second and fourth inner electrodes 25 and 35 arc disposed in this order from the third side surface 6.

Each first inner electrode 21 has a lead conductor 22 that extends to the first side surface 4 of the laminate body 1. One end of the lead conductor 22 is connected to the edge of the first inner electrode 21 on the first side surface 4 side and the other end is exposed at the first side surface 4. The lead conductors 22 are integrated with the first inner electrodes 21.

The first external connection conductor 15 entirely covers the lead conductors 22 exposed at the first side surface 4. The lead conductors 22 are physically and electrically connected to the first external connection conductor 15. In other words, the lead conductors 22 are connected directly to the first external connection conductor 15. In this way, the first inner electrodes 21 are electrically connected to each other via the first external connection conductor 15.

Among all the first inner electrodes 21, one to multiple first inner electrodes that are less than the total first inner electrodes 21 each have a lead conductor 23 that extends to the first side surface 4 of the laminate body 1 (in this embodiment, only one first inner electrodes 21 has the lead conductor 23). One end of the lead conductor 23 is connected to the edge, adjacent to the first side surface 4, of the first inner electrode 21, and the other end is exposed at the first side surface 4. The lead conductors 23 are integrated with the first inner electrodes 21.

The first terminal conductor 11 entirely covers the lead conductors 23 exposed at the first side surface 4. The lead conductors 23 are physically and electrically connected to the first terminal conductor 11. In other words, the lead conductors 23 are connected directly to the first terminal conductor 11. Since the first inner electrodes 21 are electrically connected to each other via the first external connection conductor 15, all the first inner electrodes 21 are electrically connected to the first terminal conductor 11. In this way, the first inner electrodes 21 are connected in parallel.

Each second inner electrode 25 has a lead conductor 26 that extends to the second side surface 5 of the laminate body 1. One end of the lead conductor 26 is connected to the edge, adjacent to the second side surface 5, of the second inner electrode 25, and the other end is exposed at the second side surface 5. The lead conductors 26 are integrated with the second inner electrodes 25.

The second terminal conductor 12 entirely covers the lead conductors 26 exposed at the second side surface 5. The lead conductors 26 are physically and electrically connected to the second terminal conductor 12. In other words, the lead conductors 26 are connected directly to the second terminal conductor 12. In this way, the second inner electrodes 25 are electrically connected to each other via the second terminal conductor 12.

Each third inner electrodes 31 has a lead conductor 32 that extends to the second side surface 5 of the laminate body 1. One end of the lead conductor 32 is connected to the edge, adjacent to the second side surface, of the third inner electrode 31, and the other end is exposed at the second side surface 5. The lead conductors 32 are integrated with the third inner electrodes 31.

The third external connection conductor 17 entirely covers the lead conductors 32 exposed at the second side surface 5. The lead conductors 32 are physically and electrically connected to the third external connection conductor 17. In other words, the lead conductors 32 are connected directly to the third external connection conductor 17. In this way, the third inner electrodes 31 are electrically connected to each other via the third external connection conductor 17.

Among all the third inner electrodes 31, one to multiple third inner electrodes that are less than the total third inner electrodes 31 each have a lead conductor 33 that extends to the second side surface 5 of the laminate body 1 (in this embodiment, only one third inner electrodes 31 has the lead conductor 33). One end, adjacent to the second side surface 5, of the lead conductor 33 is connected to the edge of the third inner electrode 31, and the other end is exposed at the second side surface 5. The lead conductors 33 are integrated with the third inner electrodes 31.

The third terminal conductor 13 entirely covers the lead conductors 33 exposed at the second side surface 5. The lead conductors 33 are physically and electrically connected to the third terminal conductor 13. In other words, the lead conductors 33 are connected directly to the third terminal conductor 13. Since the third inner electrodes 31 are electrically connected to each other via the third external connection conductor 17, all third inner electrodes 31 are electrically connected to the third terminal conductor 13. In this way, the third inner electrodes 31 are connected in parallel. Each fourth inner electrodes 35 has a lead conductor 36 that extends to the first side surface 4 of the laminate body 1. One end, adjacent to the first side surface 4, of the lead conductor 36 is connected to the edge of the fourth inner electrodes 35, and the other end is exposed at the first side surface 4. The lead conductors 36 are integrated with the fourth inner electrodes 35.

The fourth terminal conductor 14 entirely covers the lead conductors 36 exposed at the first side surface 4. The lead conductors 36 are physically and electrically connected to the fourth terminal conductor 14. In other words, the lead conductors 36 are connected directly to the fourth terminal conductor 14. In this way, the fourth inner electrodes 35 are electrically connected to each other via the fourth terminal conductor 14.

As described above, the first inner electrodes 21, the second inner electrodes 25, and the dielectric layers 9 in the multilayer capacitor array C1 form a first capacitor C11. More specifically, the first capacitor C11 is defined by the first and second inner electrodes 21, and the dielectric layers 9 disposed between the first and second inner electrodes 21, 25. The third inner electrodes 31, the fourth inner electrodes 35, and the dielectric layers 9 in the multilayer capacitor array C1 form a second capacitor C12. More specifically, the second capacitor C12 is defined by the third and fourth inner electrodes 31, 35 and the dielectric layers 9 disposed between the third and fourth inner electrodes 31, 35.

In the first capacitor C11 of the multilayer capacitor array C1, only one of the first inner electrodes 21 is directly connected to the first terminal conductor 11 via the lead conductor 23. That is, the number of the directly-connected first inner electrodes 21 is smaller than the total number of the first inner electrodes 21 (four of which are provided in this embodiment). In other words, the other first inner electrodes 21 are indirectly connected to the first terminal conductor 11. The resistor component of the first external connection conductor 15 is connected in series with the first terminal conductor 11. The first capacitor C11, therefore, has a larger equivalent series resistance than that of a known capacitor included in a multilayer capacitor array in which all inner electrodes are connected to the respective terminal conductors via lead conductors. Such an increase in the equivalent series resistance prevents a sudden reduction in impedance at a resonance frequency, thus enabling use of a wider bandwidth.

In the second capacitor C12 of the multilayer capacitor array C1, only one of the third inner electrodes 31 is directly connected to the third terminal conductor 13 via the lead conductor 33. That is the number of the directly-connected third inner electrodes 31 is smaller than the total number of the third inner electrodes 31 (four of which are provided in this embodiment). In other words, the other third inner electrodes 31 are indirectly connected to the third inner electrodes 31. The resistor component of the third external connection conductor 17 is connected in series with the third terminal conductor 13. The second capacitor C12, therefore, has a larger equivalent series resistance than that of a known capacitor included in a multilayer capacitor array in which all inner electrodes are connected to the respective terminal conductors via lead conductors. Such an increase in the equivalent series resistance prevents a sudden reduction in impedance at a resonance frequency, thus enabling use of a wider bandwidth.

The equivalent series resistance of the first and second capacitors C11 and C12 in the multilayer capacitor array C1 is larger than that of a known capacitor in which all inner electrodes are connected to respective terminal conductors via lead conductors.

As described above, the equivalent series resistance can be controlled in the multilayer capacitor array C1.

By adjusting the number of the first inner electrodes 21 in the first capacitor C11 that are electrically connected to the first terminal conductor 11 via the lead conductors 23, the equivalent series resistance can be set to a desired value. By adjusting the number of the third inner electrodes 31 in the second capacitor C12 that are electrically connected to the third terminal conductor 13 via the lead conductors 33, the equivalent series resistance can be set to a desired value. Therefore, the equivalent series resistance of the multilayer capacitor array C1 can be easily and precisely controlled.

By adjusting the position of the first inner electrodes 21 in the first capacitor C11, which are electrically connected to the first terminal conductor 11 via the lead conductors 23, in the laminating direction of the laminate body 1, the equivalent series resistance can be set to a desired value. By adjusting the position of the third inner electrodes 31 in the second capacitor C12, which are electrically connected to the third terminal conductor 13 via the lead conductors 33, in the laminating direction of the laminate body 1, the equivalent series resistance can be set to a desired value.

In the multilayer capacitor array C1, the first external connection conductor 15 is disposed on the first side surface 4, which is provided with the first and fourth terminal conductors 11 and 14, while the third external connection conductor 17 is disposed on the second side surface 5, which is provided with the second and third terminal conductors 12 and 13. In this way, the first and third external connection conductors 15 and 17 can be prepared simultaneously with the first and fourth terminal conductors 11 and 14. In other words, the first external connection conductor 15 and the first and fourth terminal conductors 11 and 14 can be prepared simultaneously, and the third external connection conductor 17 and the second and third terminal conductors 12 and 13 can be prepared simultaneously. As a result, the manufacturing process (preparation process of external conductors) can be simplified.

In the multilayer capacitor array C1, the opposing first and second inner electrodes 21 and 25 are separated by one dielectric layers 9. This structure can ensure a relatively high capacitance of the first capacitor C11, which is defined by the first and second inner electrodes 21 and 25 and the dielectric layers 9. The opposing third and fourth inner electrodes 31 and 35 are separated by one dielectric layers 9. This structure can ensure a relatively high capacitance of the second capacitor C12, which is defined by the third and fourth inner electrodes 31 and 35 and the dielectric layers 9. In this way, the capacitors C11 and C12 included in the multilayer capacitor array C1 can have a large capacitance while having large equivalent series resistance.

Second Embodiment

Figure 3:
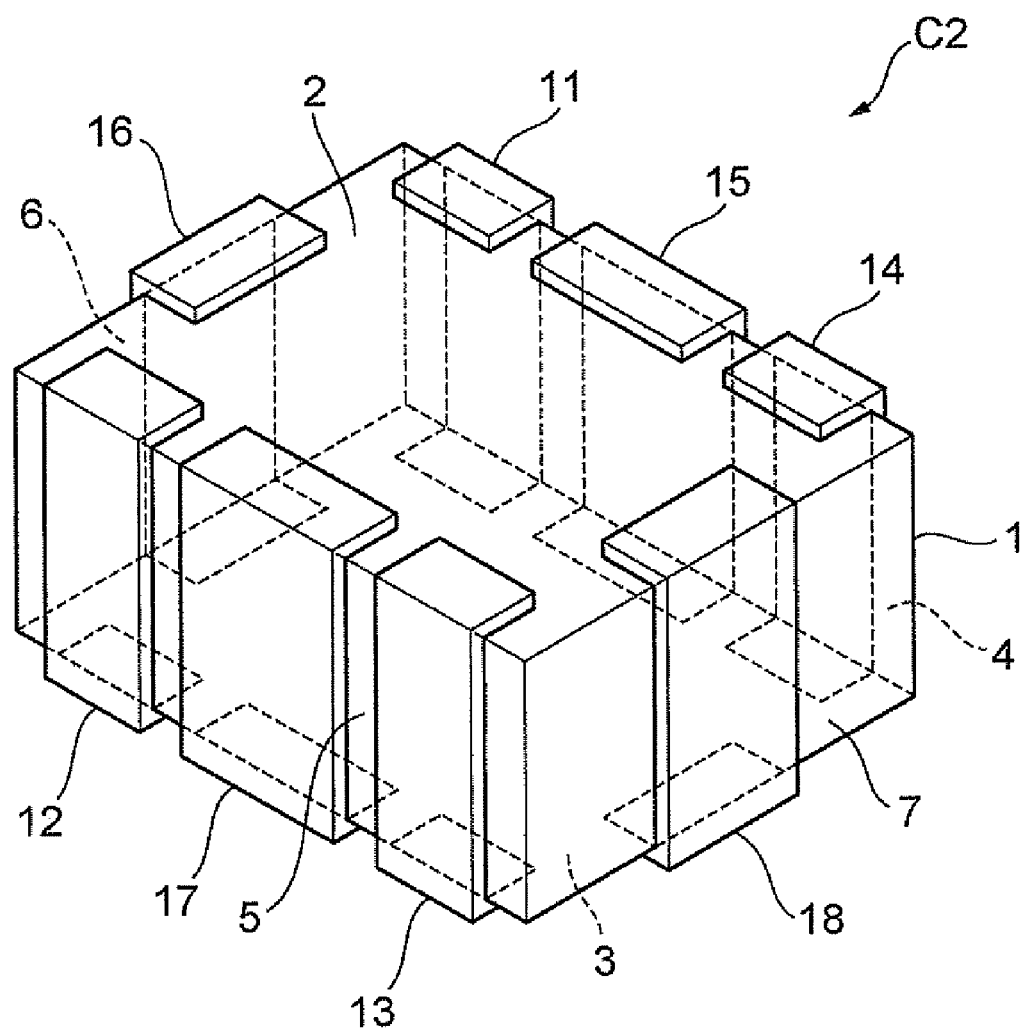
FIG. 3 is a perspective view of a multilayer capacitor array according to a second embodiment.
Figure 4:
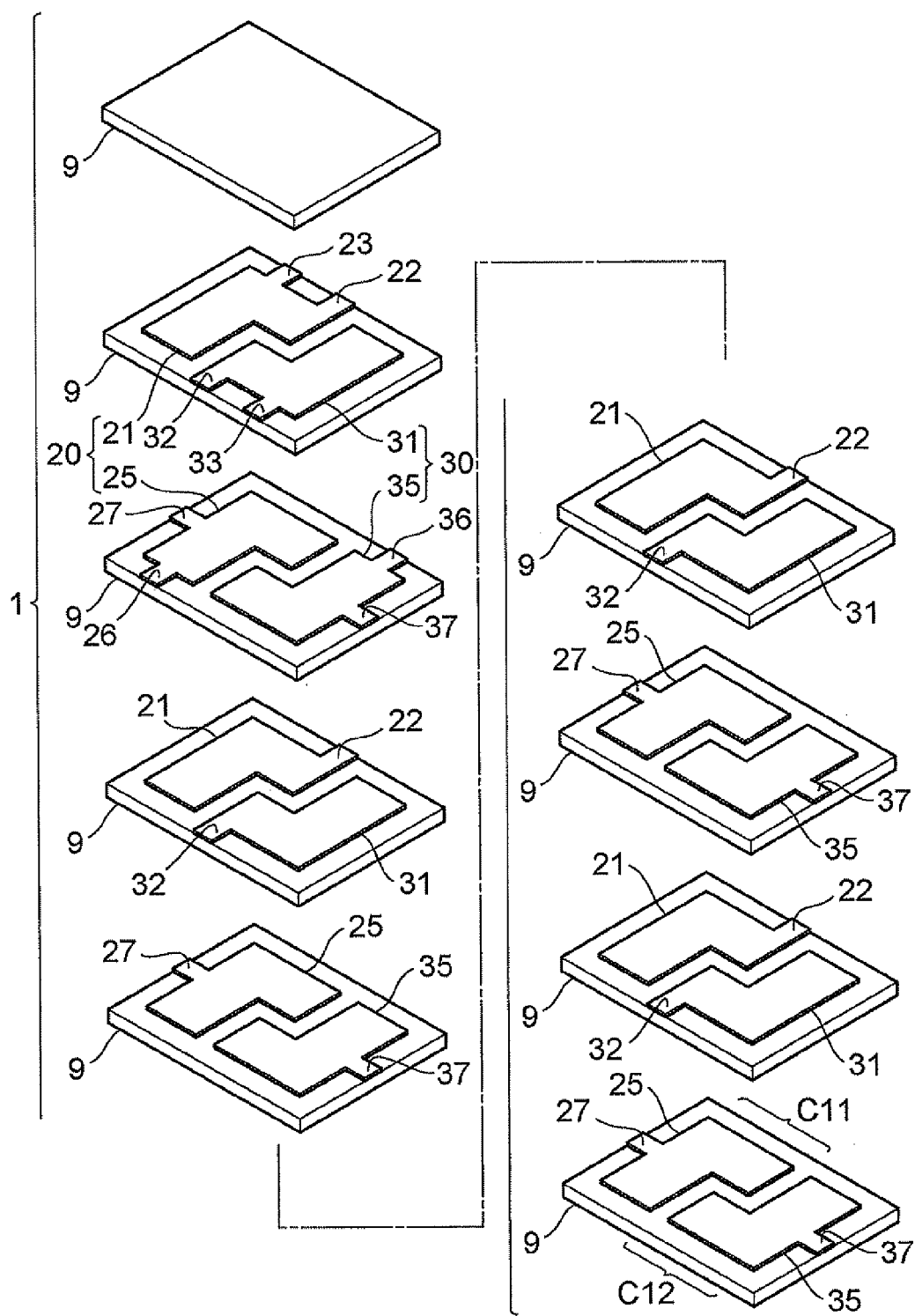
FIG. 4 is an exploded perspective view of a capacitor element included in the multilayer capacitor array according to the second embodiment.

The configuration of a multilayer capacitor array C2 according to a second embodiment of the present invention will be described with reference to FIGS. 3 and 4. The multilayer capacitor array C2 according to the second embodiment differs from the multilayer capacitor array C1 according to the first embodiment in a plurality of external conductors and, in particular, in the number of the external connecting conductors. FIG. 3 is a perspective view of the multilayer capacitor array according to the second embodiment. FIG. 4 is an exploded perspective view of a capacitor element included in the multilayer capacitor array according to the second embodiment.

With reference to FIG. 3, the multilayer capacitor array C2 of the second embodiment includes the capacitor element including a laminate body 1 and a plurality of external conductors 11 to 18 disposed on the outer surfaces of the laminate body 1.

These external conductors include the first to fourth terminal conductors 11 to 14 and the first to fourth first external connection conductors 15 to 18. The second and fourth external connection conductors 16 and 18 are formed by applying and sintering a conductive paste containing conductive metal powder and glass frit to the outer surfaces of the laminate body 1, as in the first to fourth terminal conductors 11 to 14 and the first and third external connection conductors 15 and 17. Optionally, a plating layer may be formed on the sintered conductors 16 and 18.

The second external connection conductor 16 is disposed on a third side surface 6 of the laminate body 1. The second external connection conductor 16 extends from the first main surface 2 to the second main surface 3 across the third side surface 6 so as to partly cover the third side surface 6. The second external connection conductor 16 is disposed at substantially the center of the third side surface 6 in the direction across the opposing first and second side surfaces 4 and 5.

The fourth external connection conductor 18 is disposed on a fourth side surface 7 of the laminate body 1. The fourth external connection conductor 18 extends from the first main surface 2 to the second main surface 3 across the fourth side surface 7 so as to partly cover the fourth side surface 7. The fourth external connection conductor 18 is disposed at substantially the center of the fourth side surface 7 in the direction across opposing the first and second side surfaces 4 and 5.

Each of the second inner electrodes 25 has a lead conductor 27 that extends to the third side surface 6 of the laminate body 1. One end of the lead conductor 27 is connected to the edge of the second inner electrode 25 on the third side surface 6 side and the other end is exposed at the third side surface 6. The lead conductors 27 are integrated with the second inner electrodes 25.

The second external connection conductor 16 entirely covers the lead conductors 27 exposed at the third side surface 6. The lead conductors 27 are physically and electrically connected to the second external connection conductor 16. In other words, the lead conductors 27 are connected directly to the second external connection conductor 16. In this way, the second inner electrodes 25 are electrically connected to each other via the second external connection conductor 16.

Among all the second inner electrodes 25, one to multiple second inner electrodes that are less than the total second inner electrodes 25 each have a lead conductor 26 (in this embodiment, only one second inner electrodes 25 has the lead conductor 26). Since the second inner electrodes 25 are electrically connected to each other via the second external connection conductor 16, all the second inner electrodes 25 are electrically connected to the second terminal conductor 12. In this way, the second inner electrodes 25 are connected in parallel.

Each fourth inner electrodes 35 has a lead conductor 37 that extends to the fourth side surface 7 of the laminate body 1. One end, adjacent to the fourth side surface 7, of the lead conductor 37 is connected to the edge of the fourth inner electrode 35 on the third side surface 6 and the other end is exposed at the fourth side surface 7. The lead conductors 37 are integrated with the fourth inner electrodes 35.

The fourth external connection conductor 18 entirely covers the lead conductors 37 exposed at the fourth side surface 7. The lead conductors 37 are physically and electrically connected to the fourth external connection conductor 18. In other words, the lead conductors 37 are connected directly to the fourth external connection conductor 18. In this way, the fourth inner electrodes 35 are electrically connected to each other via the fourth external connection conductor 18.

Among all the fourth inner electrodes 35, one to multiple fourth inner electrodes that are less than the total fourth inner electrodes 35 each have a lead conductor 36 (in this embodiment, only one fourth inner electrodes 35 has a single lead conductor 36). Since the fourth inner electrodes 35 are electrically connected to each other via the fourth external connection conductor 18, all the fourth inner electrodes 35 are electrically connected to the fourth terminal conductor 14. In this way, the fourth inner electrodes 35 are connected in parallel.

As described above, the first and second capacitors C11 and C12 are formed in the multilayer capacitor array C2, as in the multilayer capacitor array C1.

In the first capacitor C11 of the multilayer capacitor array C2, only one of the second inner electrodes 25 is directly connected to the second terminal conductor 12 via the lead conductors 26. That is, the number of the directly-connected second inner electrodes 25 is smaller than the total number of the second inner electrodes 25 (four in this embodiment). In other words, the other second inner electrodes 25 are indirectly connected to the second terminal conductor 12. The resistor component of the second external connection conductor 16 is connected in series with the second terminal conductor 12. The first capacitor C11, therefore, has a larger equivalent series resistance than that of a known capacitor included in a multilayer capacitor array in which all inner electrodes are connected to the respective terminal conductors via lead conductors. Such an increase in the equivalent series resistance prevents a sudden reduction in impedance at a resonance frequency, thus enabling use of a wider bandwidth.

In the second capacitor C12 of the multilayer capacitor array C2, only one of the fourth inner electrodes 35 is directly connected to the fourth terminal conductor 14 via the lead conductors 36. That is, the number of the directly-connected fourth inner electrodes 35 is smaller than the total number of the fourth inner electrodes 35 (four in this embodiment). In other words, the other fourth inner electrodes 35 are indirectly connected to the fourth terminal conductor 14. The resistor component of the fourth external connection conductor 18 is connected in series with the fourth terminal conductor 14. The second capacitor C12, therefore, has a larger equivalent series resistance than that of a known capacitor included in a multilayer capacitor array in which all inner electrodes are connected to the respective terminal conductors via lead conductors. Such an increase in the equivalent series resistance prevents a sudden reduction in impedance at a resonance frequency, thus enabling use of a wider bandwidth.

The equivalent series resistance of the first and second capacitors C11 and C12 in the multilayer capacitor array C2 is larger than that of a known capacitor in which all inner electrodes are connected to the respective terminal conductors via lead conductors.

As described above, the equivalent series resistance can be controlled in the multilayer capacitor array C2.

By adjusting the number of the second inner electrodes 25 in the first capacitor C11 that are connected to the second terminal conductor 12 via the lead conductors 26, the equivalent series resistance can be set to a desired value. By adjusting the number of the fourth inner electrodes 35 in the second capacitor C12 that are connected to the fourth terminal conductor 14 via the lead conductors 36, the equivalent series resistance can be set to a desired value. Therefore, the equivalent series resistance of the multilayer capacitor array C1 can be easily and precisely controlled.

By adjusting the position of the second inner electrodes 25 in the first capacitor C1, which are electrically connected to the second terminal conductor 12 via the lead conductors 26, in the laminating direction of the laminate body 1, the equivalent series resistance can be set to a desired value. By adjusting the position of the fourth inner electrodes 35 in the second capacitor C12, which are electrically connected to the fourth terminal conductor 14 via the lead conductors 36, in the laminating direction of the laminate body 1, the equivalent series resistance can be set to a desired value.

In the multilayer capacitor array C2, the second and fourth external connection conductors 16 and 18 are disposed on the side surfaces 6 and 7, respectively, not on the side surfaces 4 and 5 on which the first to fourth terminal conductors 11 to 14 and the first and third external connection conductors 15 and 17 are disposed. In this way, short-circuiting can be prevented among the first to fourth terminal conductors 11 to 14, the first and third external connection conductors 15 and 17, and the second and fourth external connection conductors 16 and 18.

Third Embodiment

Figure 5:
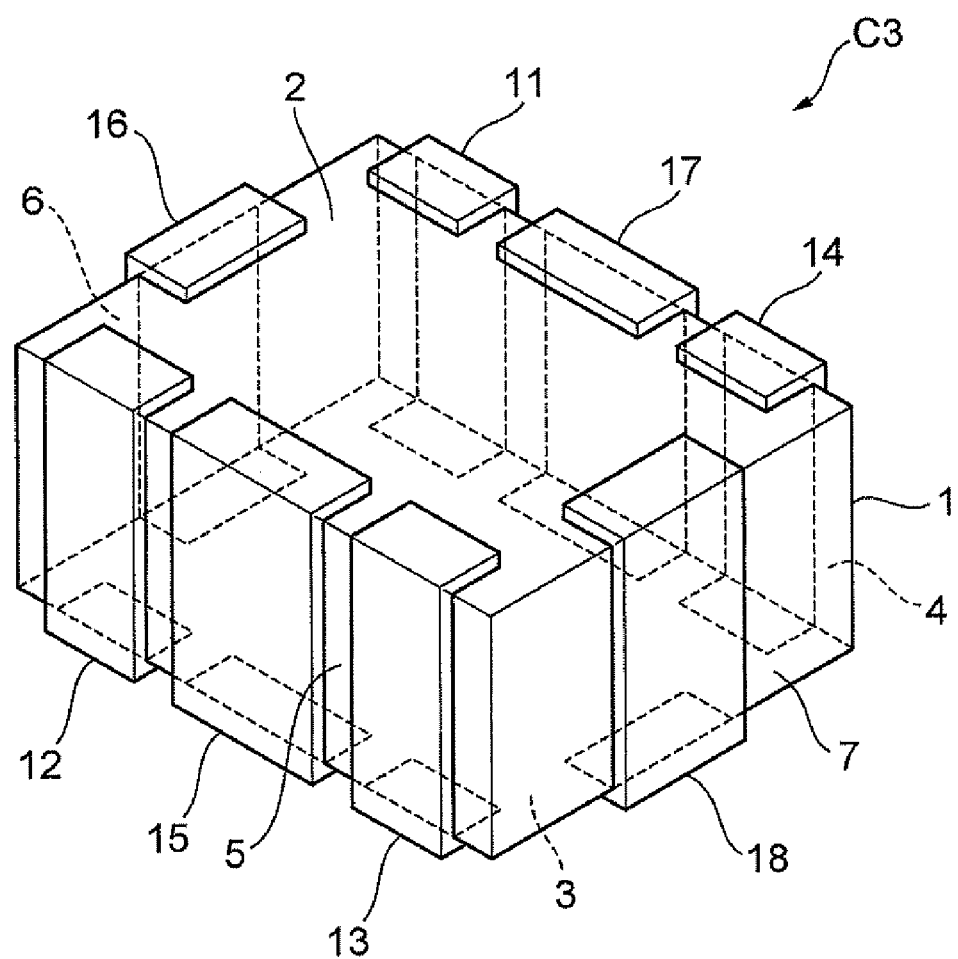
FIG. 5 is a perspective view of a multilayer capacitor array according to a third embodiment.
Figure 6:
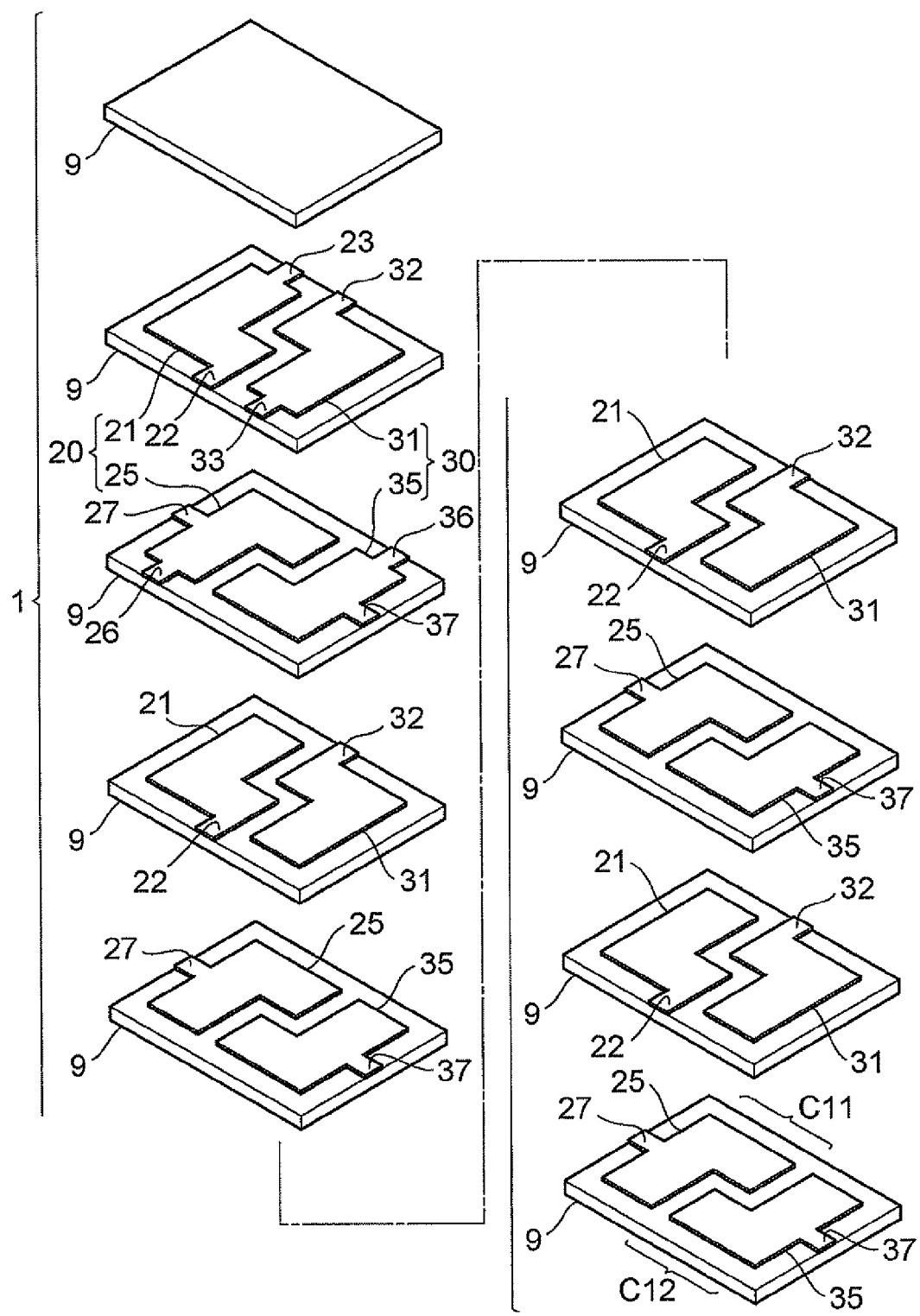
FIG. 6 is an exploded perspective view of a capacitor element included in the multilayer capacitor array according to the third embodiment.

The configuration of a multilayer capacitor array C3 according to a third embodiment of the present invention will be described with reference to FIGS. 5 and 6. The multilayer capacitor array C3 according to the third embodiment differs from the multilayer capacitor array C2 according to the second embodiment in the positions of external connection conductors. FIG. 5 is a perspective view of the multilayer capacitor array according to the third embodiment. FIG. 6 is an exploded perspective view of a capacitor element included in the multilayer capacitor array according to the third embodiment.

with reference to FIG. 5, the multilayer capacitor array C3 of the third embodiment includes the capacitor element including a laminate body 1 and a plurality of external conductors 11 to 18 disposed on the outer surfaces of the laminate body 1.

The first terminal conductor 11, the fourth terminal conductor 14, and the third external connection conductor 17 are disposed on a first side surface 4 of the laminate body 1. The first and fourth terminal conductors 11 and 14 and the third external connection conductor 17 are electrically isolated from each other at the outer surfaces of the laminate body 1. The first terminal conductor 11, the third external connection conductor 17, and the fourth terminal conductor 14 are disposed on the first side surface 4, in this order from the third side surface 6 of the laminate body 1.

The second terminal conductor 12, the third terminal conductor 13, and the first external connection conductor 15 are disposed on a second side surface 5 of the laminate body 1. The second and third terminal conductors 12 and 13 and the first external connection conductor 15 are electrically isolated from each other at the outer surfaces of the laminate body 1. The second terminal conductor 12, the first external connection conductor 15, and the third terminal conductor 13 are disposed on the second side surface 5, in this order from the third side surface 6 of the laminate body 1.

As described above, the first and second capacitors C11 and C12 are formed in the multilayer capacitor array C3 in the same manner as in the multilayer capacitor array C2. In the multilayer capacitor array C3, similar to the multilayer capacitor array C2, the equivalent series resistance can be even more precisely controlled.

In the multilayer capacitor array C3, the first external connection conductor 15 and the second and third terminal conductors 12 and 13 can be prepared simultaneously, and the third external connection conductor 17 and the first and fourth terminal conductors 11 and 14 can be prepared simultaneously. As a result, the production process (preparation process of the external conductors) can be simplified.

In the multilayer capacitor array C3, the first terminal conductor 11 and the first external connection conductor 15 are disposed on the first and second side surfaces 4 and 5, respectively. This structure ensures a long electric current path from the first terminal conductor 11 to the first external connection conductor 15. As a result, the equivalent series resistance of the capacitor C11 can be increased even more.

In the multilayer capacitor array C3, the third terminal conductor 13 and the third external connection conductor 17 are disposed on the first and second side surfaces 4 and 5, respectively. This structure ensures a long current path from the third terminal conductor 13 to the third external connection conductor 17. As a result, the equivalent series resistance of the capacitor C12 can be increased even more.

Fourth Embodiment

Figure 7:
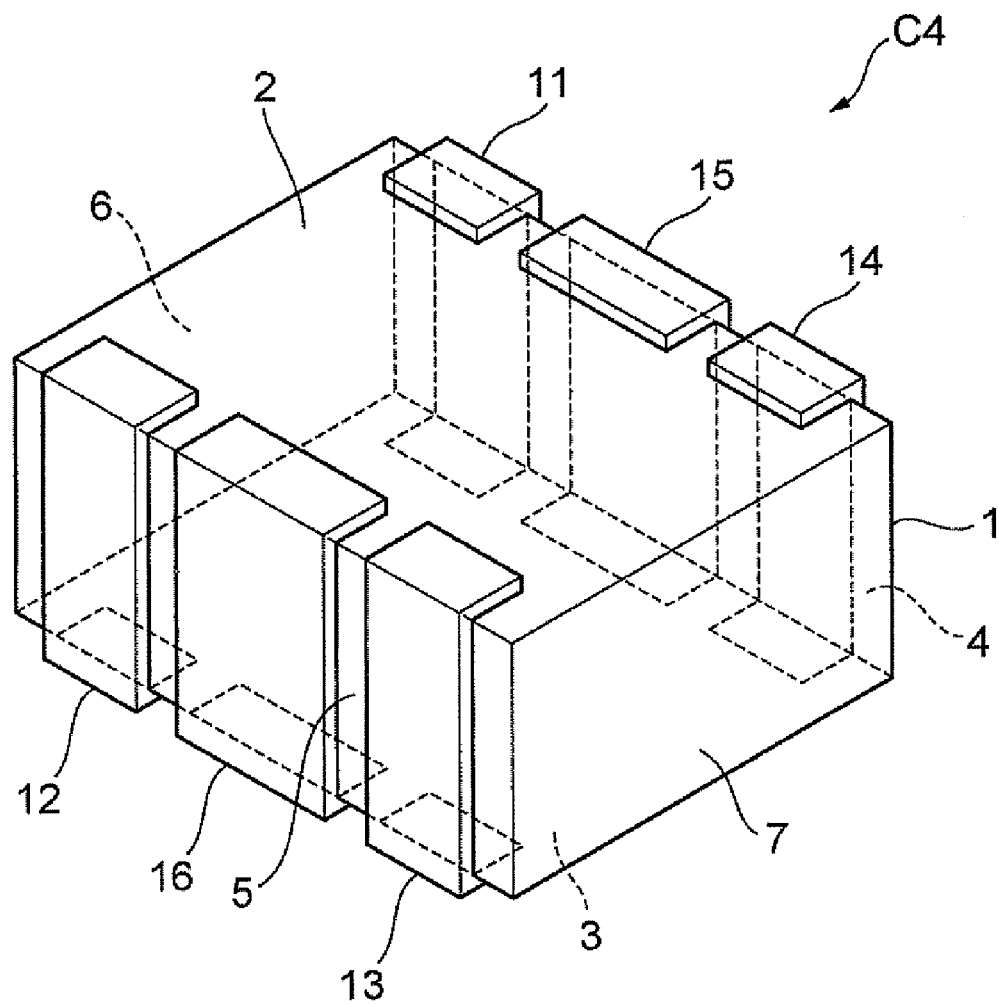
FIG. 7 is a perspective view of a multilayer capacitor array according to a fourth embodiment.
Figure 8:
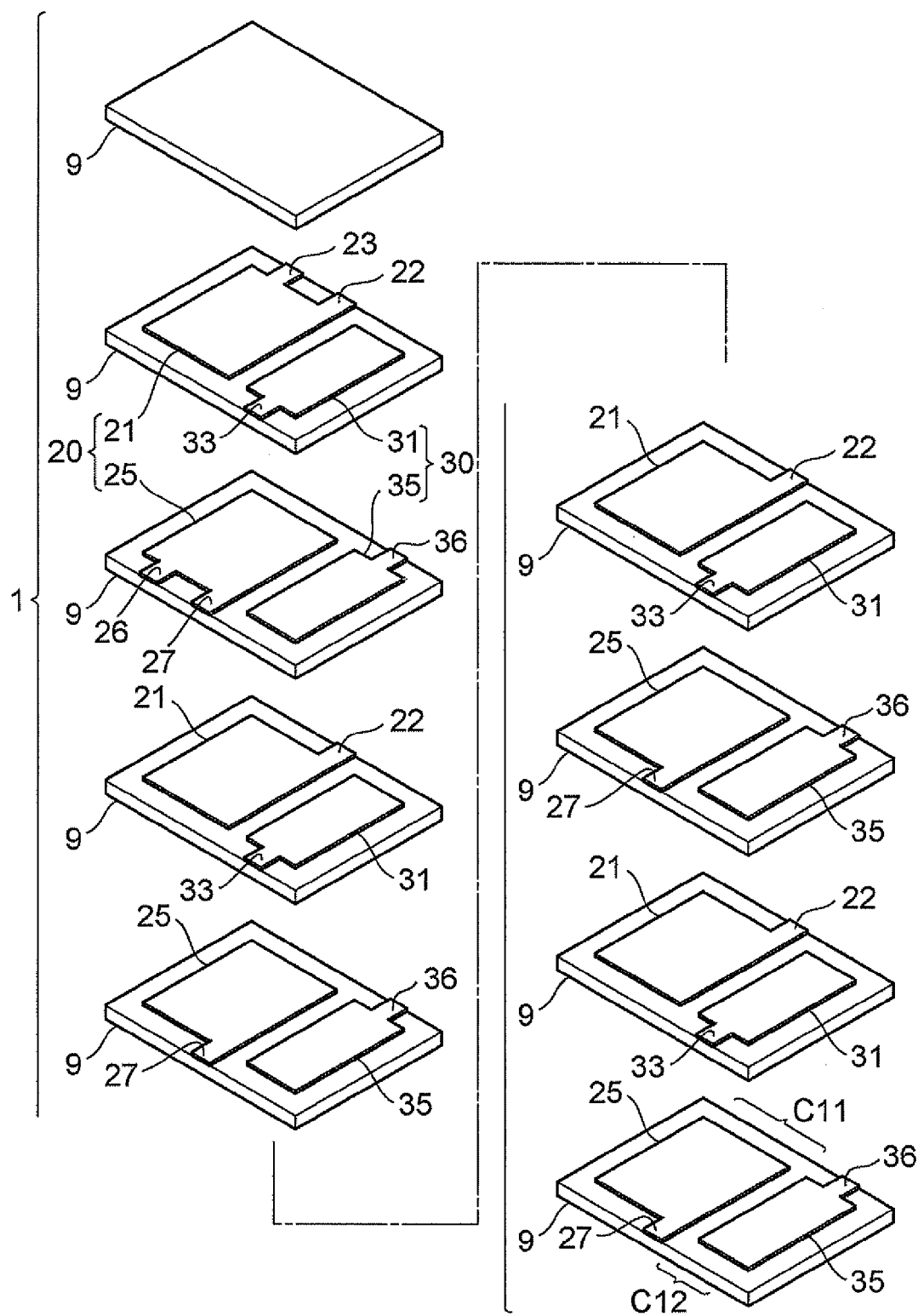
FIG. 8 is an exploded perspective view of a capacitor element included in the multilayer capacitor array according to the fourth embodiment.

The configuration of a multilayer capacitor array C4 according to a fourth embodiment of the present invention will be described with reference to FIGS. 7 and 8. The multilayer capacitor array C4 according to the fourth embodiment differs from the multilayer capacitor array C1 according to the first embodiment in the number of external connection conductors. FIG. 7 is a perspective view of the multilayer capacitor array according to the fourth embodiment. FIG. 8 is an exploded perspective view of a capacitor element included in the multilayer capacitor array according to the fourth embodiment.

With reference to FIG. 7, the multilayer capacitor array C4 of the fourth embodiment includes the capacitor element including a laminate body 1 and a plurality of external conductors 11 to 16 disposed on the outer surfaces of the laminate body 1. The external conductors include first to forth terminal conductors 11 to 14 and first and second external connection conductors 15 and 16.

The first terminal conductor 11, the fourth terminal conductor 14, and the first external connection conductor 15 are disposed on a first side surface 4 of the laminate body 1. The second terminal conductor 12, the third terminal conductor 13, and the second external connection conductor 16 are disposed on a second side surface 5 of the laminate body 1. The second external connection conductor 16 extends from the first main surface 2 to the second main surface 3 across the second side surface 5 so as to partly cover the second side surface 5. The second and third terminal conductors 12 and 13 and the second external connection conductor 16 are electrically isolated from each other at the outer surfaces of the laminate body 1. The second terminal conductor 12, the second external connection conductor 16, and the third terminal conductor 13 are disposed on the second side surface 5, in this order from the third side surface 6 of the laminate body 1.

One end of the lead conductor 27 of each second inner electrode 25 is connected to the edge of the second inner electrodes 25 on the second side surface 5 side and the other end is exposed at the second side surface 5. The lead conductors 27 are integrated with the second inner electrodes 25. The second external connection conductor 16 entirely covers the lead conductors 27 exposed at the second side surface 5. The lead conductors 27 are physically and electrically connected to the second external connection conductor 16. In other words, the lead conductors 27 are connected directly to the second external connection conductor 16. In this way, the second inner electrodes 25 are electrically connected to each other via the second external connection conductor 16.

As described above, the first and second capacitors C11 and C12 are formed in the multilayer capacitor array C4 in the same manner as in the multilayer capacitor arrays C1 to C3.

The first capacitor C11 of the multilayer capacitor arrays C4, similar to the first capacitors C11 of the multilayer capacitor arrays C2 and C3, has a larger equivalent series resistance than that of a known capacitor included in a multilayer capacitor array in which all inner electrodes are connected to the respective terminal conductors via lead conductors. Such an increase in the equivalent series resistance prevents a sudden reduction in impedance at a resonance frequency, thus enabling use of a wider bandwidth.

The equivalent series resistance of the first capacitor C11 in the multilayer capacitor array C4 is larger than that of a known capacitor in which all inner electrodes are connected to the respective terminal conductors via lead conductors.

As described above, the equivalent series resistance can be controlled in the multilayer capacitor array C4.

In the multilayer capacitor array C4, the first external connection conductor 15 is disposed on the first side surface 4, which is provided with the first and fourth terminal conductors 11 and 14, while the second external connection conductor 16 is disposed on the second side surface 5, which is provided with the second and third terminal conductors 12 and 13. In this way, the first and second external connection conductors 15 and 16 can be prepared simultaneously with the first to fourth terminal conductors 11 to 14. In other words, the first external connection conductor 15 and the first and fourth terminal conductors 11 and 14 can be prepared simultaneously, and the second external connection conductor 16 and the second and third terminal conductors 12 and 13 can be prepared simultaneously. As a result, the manufacturing process (preparation process of external conductors) can be simplified.

Preferred embodiments of the present invention have been described above. The present invention, however is not limited to the embodiments described above.

For example, the number of capacitors included in a multilayer capacitor array is not limited to the number described in the embodiments and, instead, may be three or more. The number of layers of the dielectric layers 9 and number of layers the first to fourth inner electrodes 21, 25, 31, and 35 are not limited to the number of layers described in the embodiments. For example, it is satisfactory so long as the number of layers of the first and third inner electrodes is two or more and the number of layers of the second and fourth inner electrodes is one or more.

It is satisfactory so long as at least one dielectric layer is interposed between at least one of the first inner electrodes 21 and at least one of the second inner electrodes 25 facing each other. It is satisfactory so long as at least one dielectric layer is interposed between at least one of the third inner electrodes 31 and at least one of the fourth inner electrodes 35 facing each other.

The first and third inner electrodes 21 and 31 may not be disposed on the same layer. The second and fourth inner electrodes 25 and 35 may not be disposed on the same layer. The shapes of the first to fourth inner electrodes 21, 25, 31, and 35 are not limited to those described in the embodiments, and it is satisfactory so long as the inner electrodes are electrically connected to respective external conductors.

The number of terminal conductors 11 to 14 is not limited to that described in the embodiments. The number of the external connection conductors 15 to 18 is also not limited to that described in the embodiments. The numbers of the first to fourth terminal conductors 11 to 14 may differ from each other. The numbers of the first to fourth external connection conductors 15 to 18 may differ from each other.

The number and the positions in the laminating direction of the inner electrodes directly connected to the terminal conductors 11 to 14 via the lead conductors are not limited to those described in the embodiments.

It is not necessary to control the equivalent series resistance of the capacitors included in the multilayer capacitor array. Instead, it is satisfactory so long as the equivalent series resistance of at least one capacitor included in the multilayer capacitor array is controlled, such as in the multilayer capacitor array C4. The number of layers of the inner electrodes may differ for each capacitor included in the multilayer capacitor array.

When the multilayer capacitor arrays C1 to C4 are mounted such that the first terminal conductor 11 and the third terminal conductor 13 have different polarities and that the second terminal conductor 12 and fourth terminal conductor 14 have different polarities, the first inner electrode 21 and the third inner electrode 31 disposed on the same layer have different polarities, and the second inner electrode 25 and the fourth inner electrode 35 disposed on the same layer have different polarities. In such a case, the flow directions of the electric currents in the first inner electrode 21 and the third inner electrode 31 are opposite, and the flow directions of the electric currents in the second inner electrode 25 and the fourth inner electrode 35 are opposite. In this way, the equivalent series inductance can be reduced even more.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor array comprising:
   a laminate body having a plurality of laminated dielectric layers; and
   a plurality of external conductors placed on the laminate body, the laminate body having:
   rectangular first and second principal surfaces facing each other in a laminating direction of the dielectric layers, first and second side surfaces facing each other and extending in a longitudinal direction of the first and second principal faces so as to connect the first and second principal faces, third and fourth side surfaces facing each other and extending in a transverse direction of the first and second principal faces so as to connect the first and second principal faces, a first inner electrode group including a plurality of first electrodes and a second electrode, and a second inner electrode group including a third electrode and a fourth electrode, wherein the external conductors include first to fourth terminal conductors disposed on one of the first and second side surfaces, and a first external connection conductor disposed on a side surface placed on at least one of the first to fourth terminal conductors, wherein the first inner electrode group and the second inner electrode group are adjacent to each other in an opposed direction of the third and fourth side surfaces in the laminate body, wherein at least one of the first inner electrodes and the second inner electrode are arranged as opposed with at least one of the dielectric layers in between, wherein the third and fourth inner electrodes are arranged as opposed with at least one of the dielectric layers in between, wherein the first inner electrodes are electrically connected to the first external connection conductor via lead conductors, wherein the second inner electrode is electrically connected to the second terminal conductor via a lead conductor, wherein the third inner electrode is electrically connected to the third terminal conductor via a lead conductor, wherein the fourth inner electrode is electrically connected to the fourth terminal conductor via a lead conductor, and wherein, among all the first inner electrodes, one to multiple first inner electrodes that are less than the total first inner electrodes are electrically connected to the first terminal conductor via lead conductors.

2. The multilayer capacitor array according to claim 1, wherein the first terminal conductor, the fourth terminal conductor, and the first external connection conductor are disposed on the first side surface, and the second and third terminal conductors are disposed on the second side surface.

3. The multilayer capacitor array according to claim 1, wherein the first and the fourth terminal conductors are disposed on the first side surface, and the second terminal conductor, the third terminal conductor, and the first external connection terminal are disposed on the second side surface.

4. The multilayer capacitor array according to claim 1, wherein the first inner electrode group is positioned on the third side surface side in the opposed direction of the third and fourth side surfaces, the external conductors further include a second external connection conductor disposed on the third side surface, the first inner electrode group includes a plurality of the second inner electrodes, the second inner electrodes are electrically connected to the second external connection conductor via lead conductors, and among all the second inner electrodes, one to multiple second inner electrodes that are less than the total second inner electrodes are electrically connected to the second terminal conductors via lead conductors.

5. The multilayer capacitor array according to claim 4, wherein the first and second inner electrodes are arranged as opposed with at least one of the dielectric layers in between.

6. The multilayer capacitor array according to claim 1, wherein the second inner electrode group includes a plurality of the third inner electrodes, the external conductors further include a third external connection conductor disposed on a side surface on which at least one of the first to fourth terminal conductors is disposed, at least one of the third inner electrodes and the fourth inner electrode are arranged as opposed with at least one of the dielectric layers in between, the third inner electrodes are electrically connected to the third external connection conductor via lead conductors, and among all the third inner electrodes, one to multiple third inner electrodes that are less than the total third inner electrodes are electrically connected to the third terminal conductors via lead conductors.

7. The multilayer capacitor array according to claim 6, wherein the first terminal conductor, the fourth terminal conductor, and the third external connection conductor are disposed on the first side surface, and the second and third terminal conductors are disposed on the second side surface.

8. The multilayer capacitor array according to claim 6, wherein the first and fourth terminal conductors are disposed on the first side surface, and the second terminal conductor, the third terminal conductors, and the third external connection conductor are disposed on the second side surface.

9. The multilayer capacitor array according to claim 6, wherein the second inner electrode group is positioned on the fourth side surface side across the third and fourth side surfaces, the external conductors further include a fourth external connection conductor disposed on the fourth side surface, the second inner electrode group includes a plurality of the fourth inner electrodes, the fourth inner electrodes are electrically connected to the fourth external connection conductor via lead conductors, and among all the fourth inner electrodes, one to multiple fourth inner electrodes that are less than the total fourth inner electrodes are electrically connected to the fourth terminal conductors via lead conductors.

10. The multilayer capacitor array according to claim 9, wherein the third and fourth inner electrodes are arranged as opposed with at least one of the dielectric layers in between.

11. The multilayer capacitor array according to claim 1, wherein
at least one of the first and second inner electrodes and at least one of the third and fourth inner electrodes are disposed on the same layer, and
the inner electrodes disposed on the same layer have different polarities.

* * * * *